United States Patent [19]

Fujiwara

[11] Patent Number: 4,999,836
[45] Date of Patent: Mar. 12, 1991

[54] ISDN NETWORK TERMINATION UNIT ENABLING TO ESTABLISH DATA LINK BETWEEN ONE TERMINAL EQUIPMENT AND OTHER TERMINAL EQUIPMENTS CONNECTED TO THE UNIT WITHOUT USE OF SUBSCRIBER LINE

[75] Inventor: Ryuhei Fujiwara, Tokyo, Japan

[73] Assignee: NEC Corporation, Tokyo, Japan

[21] Appl. No.: 362,778

[22] Filed: Jun. 7, 1989

[30] Foreign Application Priority Data

Jun. 7, 1988 [JP] Japan .............................. 63-138488

[51] Int. Cl.⁵ .......................... H04J 3/12; H04Q 11/04
[52] U.S. Cl. .................................... 370/110.1; 370/60
[58] Field of Search .................. 370/110.1, 60, 60.1, 370/58.1, 58.2, 58.3, 66, 67, 85.1, 94.1, 94.2, 94.3

[56] References Cited

U.S. PATENT DOCUMENTS

| | | | |
|---|---|---|---|
| 4,792,800 | 12/1988 | Fujioka et al. | 370/110.1 |
| 4,835,769 | 5/1989 | Donaghue, Jr. et al. | 370/110.1 |
| 4,847,833 | 7/1989 | Doering et al. | 370/110.1 |
| 4,935,923 | 6/1990 | Shimizu et al. | 370/60 |

Primary Examiner—Douglas W. Olms
Assistant Examiner—Wellington Chin
Attorney, Agent, or Firm—Sughrue, Mion, Zinn, Macpeak & Seas

[57] ABSTRACT

An ISDN network termination unit for connecting a user's bus line connected to a plurality of terminal equipments and a subscriber line extending from an exchanging office receives and transmits a D channel signal from one of the exchanging office and each terminal equipment to the other to thereby establish a data link between them on the D channel. The D channel signal is provided with an identifier code field. In order to establish a data link between the terminal equipments on the D channel without use of the subscriber line and the exchanging office, the ISDN network termination unit is provided with an identifier code holder for holding a predetermined identifier code and a deciding circuit for deciding whether or not the identifier code in the D channel signal from a specific one of the terminal equipment is equal to the predetermined identifier code. When both are equal to each other, the D channel signal is returned by a returning circuit to the terminal equipments through the user's line to thereby establish the data link between the specific terminal equipment and the other terminal equipments through the network termination unit. It may be made that a start flag and a stop flag are additionally detected so as to control the returning circuit.

6 Claims, 3 Drawing Sheets

ISDN NETWORK TERMINATION UNIT ENABLING TO ESTABLISH DATA LINK BETWEEN ONE TERMINAL EQUIPMENT AND OTHER TERMINAL EQUIPMENTS CONNECTED TO THE UNIT WITHOUT USE OF SUBSCRIBER LINE

BACKGROUND OF THE INVENTION

1. Field of the Invention

The present invention relates to an integrated services digital network (ISDN) system according to recommendation of the CCITT (International Telegraph and Telephone consultative communication) and, in particular, to ISDN network termination units for connecting user's terminal equipments and a subscriber line extending to an ISDN digital switch.

2. Description of the Prior Art

In the ISDN system, a digital subscriber line (DSL) extends from an exchanging office to a user's area. The DSL terminates to a network termination (NT) unit. A user's bus line is connected to the NT unit and extended in the user's area. That is, the NT unit comprises a first port connected to the user's bus line and a second port connected to the DSL. A plurality of terminal equipments (TEs) are connected to the user's bus line in parallel with one another. As TEs, there are known a digital telephone set or sets (which will only be called telephone sets hereinafter), a facsimile set or sets, a personal computer set or sets, and the like.

The CCITT recommendations I series prescribes protocol of user-network connection or interface in connection with seven classified layers which are numbered by 1 through 7. For example, layer 1 is directed to physical connecting conditions such as transmission rate, pin number connectors and others, layer 2 being for data link, layer 3 for call control from a call setup to call release completion.

According to the I series, communication information and control signal are transmitted through different channels which are multiplexed in a time division fashion. The communication information channel is called a B channel and the control channel is referred to as a D channel. It is possible to transmit communication information through the D channel.

As a basic one of user-network interface structures, a basic interface is determined which comprises two B channels of a transmission rate of 64 kbps which are separately called B1 and B2 channels and a single D channel of a transmission rate of 16 kbps.

The basic interface is used for transmission of the communication information and the control signal between the TEs and the NT. That is, the B1 and B2 channels signals and the D channel signals are transmitted between the TEs and the NT as a first time division multiplexed (TDM) signal.

A frame of the first TDM signal of the basic interface will later be described with reference to the drawings.

In connection with the layer 2 for data link, a plurality of logical connections or links are made on D channel by use of LAPD (Link Access Procedure on D channel). Various control information in layer 2 and layer 3 can be transmitted through the links. A frame format of the LAPD is in conformity with the HDLC High-level Data Link Control Procedure) and comprises a start flag, an address field including an identifier code, an information field, a stop flag and others. The frame format will later be described in detail with reference to the drawings.

The NT usually comprises a demultiplexer, a DSL interface and a multiplexer. The demultiplexer is coupled to the first port and demultiplexes the first TDM signal incoming through the first port from one of the TEs to extract the D channel signal in the first TDM signal as a first D channel signal. The first D channel signal is delivered to the DSL interface. The DSL interface is coupled to the second port and transmits the first D channel signal as a second D channel signal in a second TDM signal to the second port. Thus, the second D channel signal is sent out to the DSL through the second port. On the other hand, the DSL interface receives a third TDM signal incoming through the second port from the exchanging office and extracts a third D channel signal in the third TDM signal. The third D channel signal is delivered to the multiplexer. The multiplexer is coupled to the first port and multiplexes the third D channel signal as a fourth control signal in a fourth TDM signal. The fourth TDM signal is delivered to the first port and transmitted to TEs through the user's bus line.

The D channel signal is transmitted from one of TEs to the exchanging office line through the NT and the data link is established. Then, communication information can be transmitted on the data link established. In the similar manner, the D channel signal is also transmitted from the exchanging office to one of TEs which is destined by the address field through the NT and therefore, a data link is also established which extends from the exchanging office to the destined TE.

In the known ISDN system, the data links are established between TEs and the exchanging office through the NT. Therefore, communication between two of the TEs on the same user's bus line is performed by use of the DSL through the exchanging office but cannot be performed without use of the DSL. This is disadvantageous in efficient use of the DSL, in operation rate of the exchanging switch in the office and in user's expenses.

SUMMARY OF THE INVENTION

Therefore, it is an object of the present invention to provide a network termination unit for use in an ISDN system which enables to establish a data link between two terminal equipments on the same user's line without use of a digital subscriber line connected to the network termination unit.

The present invention is applicable to a network termination unit for use in an integrated services digital network (ISDN) system. The network termination unit comprises a first port to which a plurality of terminal equipments are connected in parallel with one another, a second port to which a digital subscriber line is connected, a demultiplexer coupled to the first port for demultiplexing a first TDM (Time Division Multiplexed) signal incoming through the first port from one of the terminal equipments to extract a first control channel signal for establishing a data link, the first control channel signal having an identifier code, a digital subscriber line interface circuit coupled to the second port for transmitting the first control channel signal as a second control channel signal in a second TDM signal to the second port, the digital subscriber line interface circuit receiving a third TDM signal incoming through the second port to extract a third control channel signal, and a multiplexer coupled to the first port for multiplexing the third control channel signal as a fourth control channel signal in a fourth TDM signal to deliver the fourth TDM signal to the first port. According to the present invention, the terminal network unit comprises code holding means for holding a predetermined code, code deciding means coupled with the demultiplexer and the code holding means for deciding whether or not the identifier code in the first control signal is coincident with the predetermined identifier code, the code deciding means producing a return control signal when the identifier code is coincident with the predetermined code, and returning means coupled with the code deciding means and responsive to the return control signal for returning the first control channel signal as a return signal to the multiplexer, the multiplexer receiving the return signal as the third control channel signal to thereby return the first control channel signal to the first port as the fourth control channel signal in the fourth TDM signal without delivering the second TDM signal including the first control channel signal to the second port.

According to an aspect of the present invention, the code deciding means may comprise first detector means. The first detector means comprises first shift register means coupled to demultiplexer and having a first serial output and a first set of parallel outputs, and first comparing means coupled to the code holding means and the first set of parallel outputs of the first shift register means for comparing the first set of outputs and the predetermined code in the code holding means to produce a first coincident signal as the return control signal when the first set of parallel outputs is coincident with the predetermined code.

Usually, the first control channel signal further comprises a predetermined start flag code. The code deciding means may further comprise start flag holding means for holding the predetermined start flag code, and second detector means. The second detector means comprises second shift register means coupled to the first serial output of the first shift register means and having a second serial output and a second set of parallel outputs, second comparing means coupled to the start flag deciding means and the second set of parallel outputs of the second shift register for comparing the second set of parallel outputs and the predetermined start flag code to produce a coincident signal as an available signal when the set of second parallel outputs is coincident with the predetermined start flag code, and permitting means coupled with the first and the second comparing means and the returning means for permitting the return control signal to pass to the returning means only a time duration when the available signal is produced from the second comparing means.

Usually, first control channel signal further comprises a predetermined stop flag code. The network termination unit may further comprise stop flag holding means for holding the predetermined stop flag code, and stop flag deciding means coupled with the returning means and the stop flag holding means for deciding the predetermined stop flag code in the return signal to produce a stop signal, the stop signal being supplied to the returning means, the returning means being unable in response to the stop signal.

DESCRIPTION OF PREFERRED EMBODIMENT

Prior to description of an embodiment, a known ISDN system will be described for the purpose of better understanding of the present invention.

Figure 1:
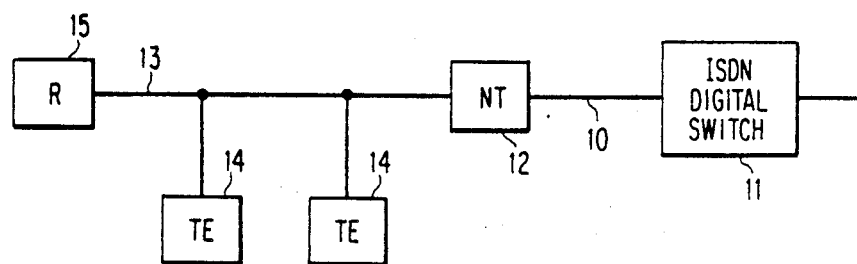
FIG. 1 is a schematic block diagram view illustrating a known ISDN system.

Referring to FIG. 1, a plurality of digital subscriber lines (DSLs) 10 are connected to at least one ISDN digital switch or exchanger 11. In the figure, two ISDN digital switches 11 are shown to be connected through an interoffice line. Each of DSLs 10 is terminated at an individual network termination (NT) unit 12. The NT unit 12 is connected to a user's bus line 13 (which is usually two paired wires) to which a plurality of terminal equipments (TEs) 14, for example, digital telephone sets, facsimile sets, personal computers, and the like are connected in a parallel form. Each user's bus line 13 is terminated to a terminal resistor 15 at an extended end.

In the system, communication can be performed between one or more TEs 14 in one user's bus line 13 and one or more TEs 14 on another user's bus line 13 through the ISDN digital switch or switches 11.

The shown ISDN system is arranged dependent on the CCITT recommendations described in the preamble. For example, the basic interface is used between the bus line 13 and the NT 22. That is, two B channel signals B1 and B2 and a single D channel signal are transmitted on the bus line 13 and the DSL 10 between NTs and the ISDN digital switch 11 through NT 12 as a basic TDM signal.

The D channel bits in the TDM signal from TE to NT are copied in the E bits in another TDM signal from NT to TE. This is for indicating whether or not the D channel is busy. A source TE can check by use of the E bits whether or not the D channel is transmitted therefrom correctively.

Figure 2:
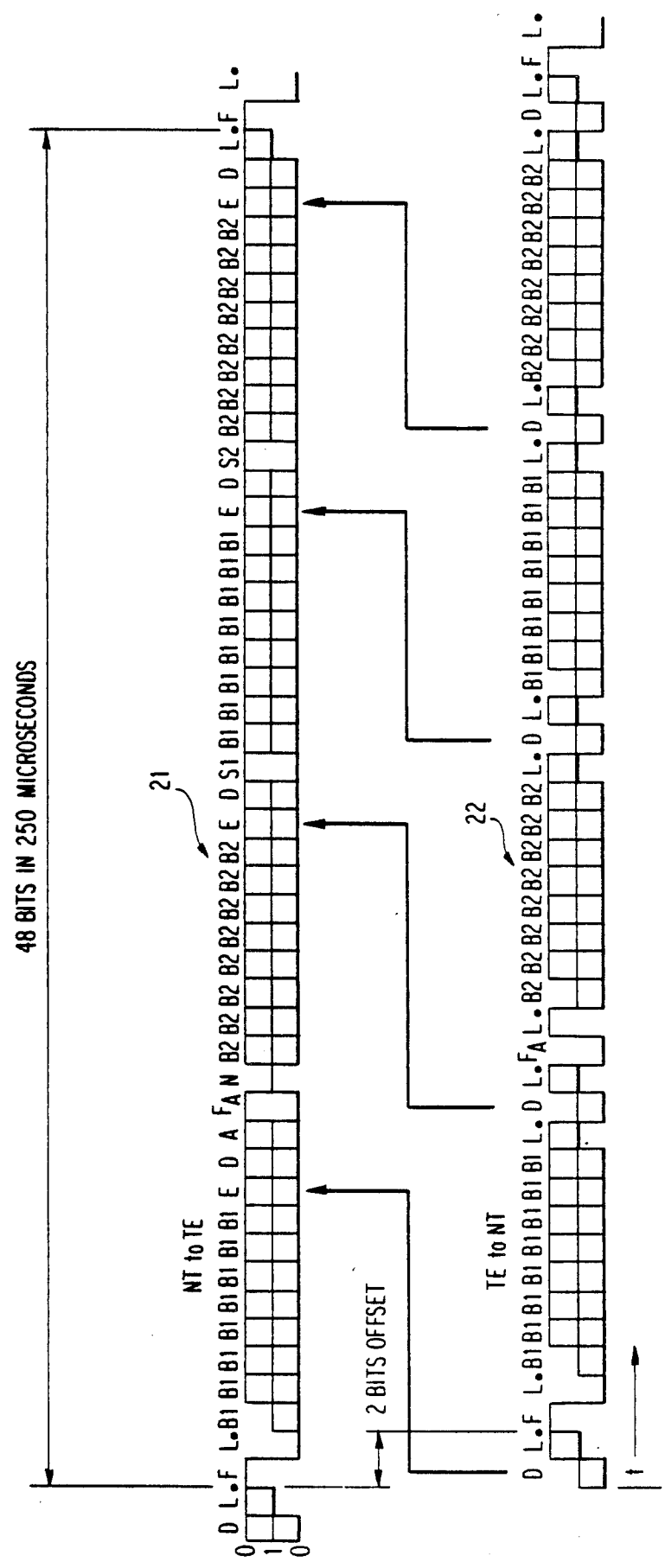
FIG. 2 is a view illustrating a frame format of a basic TDM signal transmitted on a user's line between a network termination unit and terminal equipments in the system in FIG. 1.

Referring to FIG. 2, a frame of the basic TDM signal transmitted from NT to TE is shown at 21 and another frame of the basic TDM signal from TE to NT is shown at 22. Each of the frames 16 and 17 comprises 48 bits. In FIG. 2, F represents a frame bit, L being a DC parallel bit, D being a D channel bit, E being a D echo channel bit, FA being a spare frame bit (=0), N bit being set equal to FA, B1 being a B1 channel bit, B2 being a B2 channel bit, A bit being used for start, S1 and S2 being spare bits for future standards.

According to the D channel protocol for layers 2 and 3, the LAPD frame is used for the D channel.

Figure 3:
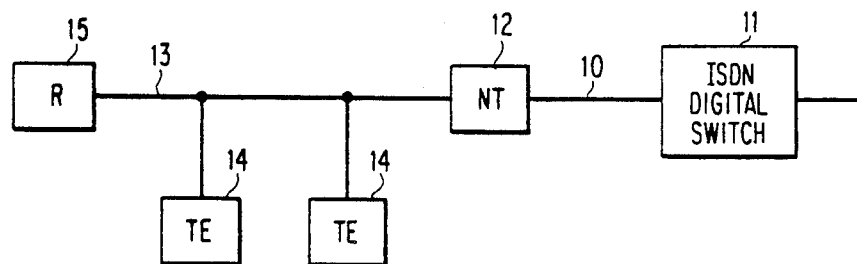
FIG. 3 is a frame format of a control channel carried by the basic TDM signal.
Figure 3:
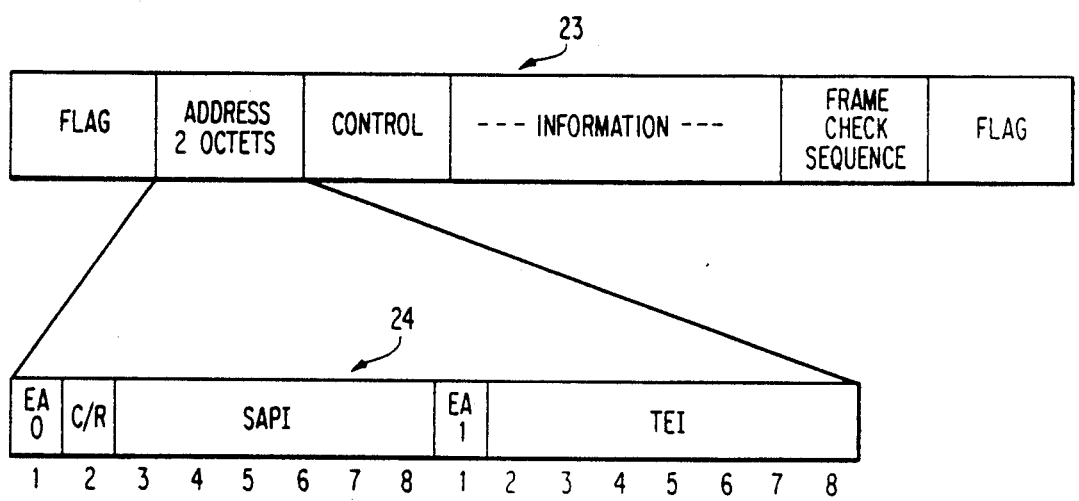

Referring to FIG. 3, an LAPD frame 23 comprises a start flag field (FLAG) of one octet length, an address field (ADDRESS) of two octet length, a control field (CONTROL) of one octet length, an information field (INFORMATION) of a variable length (260 octets at maximum), a frame check sequence (FRAME CHECK SEQUENCE) of one or two octet length, and a stop flag field (FLAG) of one octet length.

Various frame types such as I, UI, and others are determined for the LAPD frame and each type is identified in the control field as described in the preamble.

The address field comprises EA0 of one bit, C/R of one bit, SAPI of 6 bits, EA1 of one bit and TEI of 7 bits similar to a frame portion as shown at 24 in FIG. 3. EA is an address extension bit and EA0 means continuation to the next octet while EA1 means a last octet in the field. C/R is for indicating that the frame is command or response. SAPI is a service access point identifier and TEI is a terminal endpoint identifier. SAPI can take a value from 0 to 63 and several functions are determined for several values in the I series of the CCITT recommendations. That is SAPI=0 means that the frame is for call control signal. SAPI=1 means that the frame is for a new mode packet. SAPI=16 means that the frame is for packet data. And SAPI=62 means that the frame is for a test or maintenance. And SAPI=63 means that the frame is for management. The remaining values are spare and are not yet determined. TEI can take a value from 0 to 72 and TEI values from 64 to 126 are assigned to TEs 14 in each user and registered in a TEI list (not shown) in the ISDN switch. Values from 0 to 63 are left for free use by users and the remaining value 127 is determined to identify a broadcasting mode.

In the ISDN system, one of TEs 14 connected to the NT 12 in common can communicate with TE 14 connected to another NT 12 through one or more ISDN digital switches 11 and can also communicate with another TE 14 connected to the same user's bus line 13 through the common NT 12, the DSL 10 and the ISDN digital switch 11. However, the TE 14 cannot directly communicate with the other TE 14 through the common user's bus line without use of the DSL 10 and the ISDN digital switch 11.

In use of an ISDN network termination unit of the present invention, a plurality of TEs connected to the same user's bus line can communicate to each other without use of the DSL and the ISDN digital switch in the exchanging office.

Figure 4:
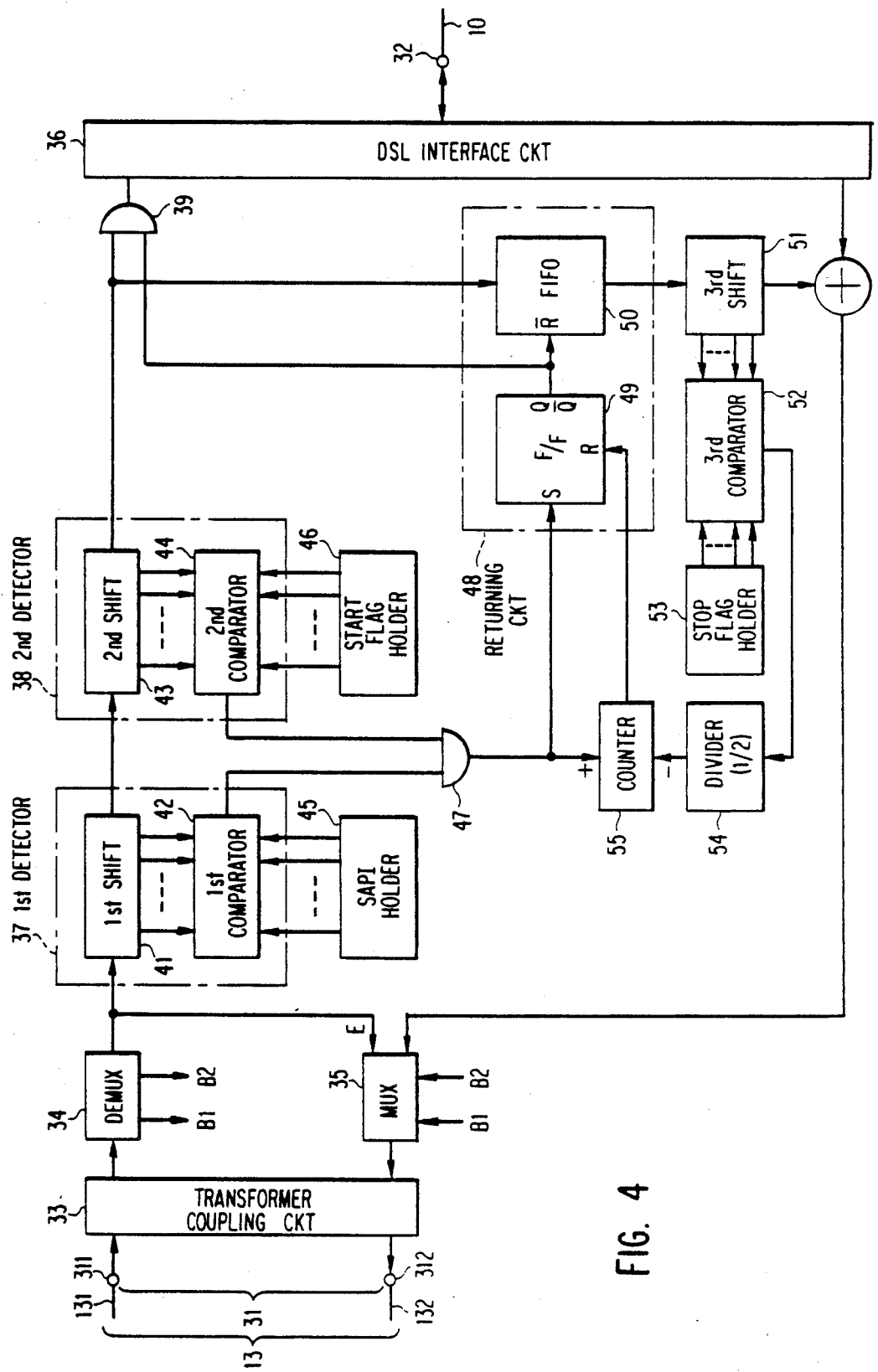
FIG. 4 is a block diagram of a network termination unit according to an embodiment of the present invention.

Referring to FIG. 4, an NT unit 30 according to one embodiment of the present invention comprises a first port 31 and a second port 32 which should be connected to the user's bus line 13 and the DSL 10, respectively. The first port 31 comprises an input port 311 and an output port 312 to be connected to an incoming paired line 131 and an outgoing paired line 132, respectively.

The NT 30 further comprises a transformer coupling circuit 33 coupled with the first port 31. A demultiplexer 34 and a multiplexer 35 are coupled to the input port 311 and the output port 312 through the transformer coupling circuit 33, respectively. The demultiplexer 34 is for receiving and demultiplexing the basic TDM signal 22 (FIG. 2) incoming through the first port 31 and the transformer coupling circuit 33 to extract the D signal channel, that is, the LAPD signal 23 (FIG. 3). The D channel signal is applied to a DSL interface circuit 36 through a first and a second detector 37 and 38 and an AND gate 39. The B1 and B2 channel signals are also extracted from the basic TDM signal and are applied to the DSL interface circuit 36.

The DSL interface circuit 36 is coupled to the second port 32. The DSL interface circuit 36 multiplexes the D channel signal and the B1 and B2 channel signals to a TDM signal with a high rate. The TDM signal is delivered to the second port 32 so as to transmit the TDM signal to the DSL 10. The DSL interface circuit 36 also receives and demultiplexes a TDM signal incoming through the second port 32 transmitted onto DSL 10 from the ISDN digital switch 11 (FIG. 1) to produce a D channel signal and B1 and B2 channel signals.

The D channel signal is applied to the multiplexer 35 through an adder 40 and the B1 and B2 channel signals are also applied to the multiplexer 35. The multiplexer 35 multiplexes the D channel signal and the B1 and B2 channel signals to produce a basic TDM signal which is delivered to first port 31 through the transformer coupling circuit 33 to transmit the basic TDM signal to TEs 14 (FIG. 1).

The first detector 37 comprises a first shift register (1st SHIFT) 41 and a first comparator 42 and the second detector 38 also comprises a second shift register (2nd SHIFT) 43 and a second comparator 44. The first shift register 41 is connected to the demultiplexer 34 so as to receive the D channel signal and the second shift registers 43 is cascade-connected to the first shift register 41. Each of the first and the second shift registers 41 and 43 is an eight-bit register and has eight parallel outputs and a serial output. The first and the second comparators 42 and 44 are connected to eight parallel outputs of the first and the second shift registers 41 and 43, respectively.

The NT 30 further comprises a code holder 45 and a start flag holder 46 which are previously set with a predetermined identifier code and a predetermined start flag code, respectively. The predetermined identifier code indicates a value previously selected from spare values of the SAPI and the start flag code indicates the start flag in the LAPD frame determined in the ISDN system.

The first comparator 42 compares the predetermined identifier code in the code holder 45 with content in the first shift register 41 and produces a first coincident signal when the content in the first register 41 is coincident with the predetermined identifier code. Therefore, the first shift register 41 and the first comparator 42 detect whether or not the D channel has the identifier code equal to the predetermined identifier code. The first coincident signal is referred to as a return control signal.

The second comparator 44 compares the start flag code in the start flag holder 46 with content in the second shift register 43 and produces a second coincident signal when the content in the second register 43 is coincident with the start flag code. Therefore, the second shift register 43 and the second comparator 44 detect whether or not the D channel signal has the start flag code equal to the predetermined start flag code. The second coincident signal is referred to as an available signal hereinafter.

An AND gate 47 is coupled to the first and the second comparators 42 and 44 and permits the return control signal to pass therethrough during a time duration when the AND gate 47 receives the available signal from the second comparator 44.

The first and the second comparators 37 and 38, the start flag holder 46 and the AND gate 47 form a decision circuit for deciding whether or not the predetermined identifier code is in the D channel signal. It is possible by the first detector 37 to detect whether or not the predetermined identifier code is in the D channel signal. However, it is confirmed by use of the second detector 38 and the AND gate 47 that the detected predetermined identifier code is in the SAPI field in the D channel signal.

The NT 30 further comprises a returning circuit 48 which is connected to the AND gate 47. The returning circuit 48 comprises a flipflop 49 and a first-in first-out buffer memory or register (FIFO) 50. The flipflop 49 is set by reception of the return control signal through the AND gate 47 to produce a set output at an output terminal. The flipflop 49 is reset by reception of a reset signal to produce a reset output at the output terminal.

The first-in first-out register 50 has an input terminal connected to a serial output of the second shift register 43, an output terminal connected to the adder 40 and a drive terminal R connected to the output terminal of the flipflop 49. When receiving as an enabling signal the set output from the flipflop 49, the first-in and first-out register 50 starts its operation for taking in the D channel signal delivered from the second shift register 43 and sending out it to the adder 40. On the other hand, when receiving as an unable signal the reset output from the flipflop 49, the first-in first-out register 50 stops its operation.

It is possible to use AND gate in place of the first-in first-out register 50.

A third shift register (3rd SHIFT) 51 is also coupled to the output of the first-in first-out register 50. The third shift register 51 is an eight-bit register which has eight parallel outputs. A third comparator 52 is connected to the eight parallel outputs of the third shift register 51. A stop flag holder 53 is coupled with the third comparator 52. The stop flag holder 53 is previously set with and holds a stop flag code which is previously determined in the ISDN system. The third comparator 52 compares the content in the third shift register 51 with the stop flag code in the stop flag holder 53 to produce a third coincidence signal when the content is coincident with the stop flag code.

Therefore, the third shift register 51 and the third comparator 52 make a third detector for detecting whether or not the D channel signal has a stop flag code equal to the predetermined stop flag code.

In the ISDN system, since the stop flag code is determined equal to the start flag code, the third coincidence signal is produced both time instances when the start flag code is registered in the third register 51 and when the stop flag code is registered in the third register 51. Therefore, in order to obtain a detection signal corresponding to not the start flag code but the stop flag code, a divider 54 is coupled to an output of the third comparator 52. Therefore, the divider 54 produces an output signal as the detection signal one at a time when the third coincidence signal is received twice. Accordingly, the third shift register 51, the third comparator 52 and the divider 54 form a decision circuit whether or not the D channel signal has the predetermine stop flag code.

When the stop flag code would be determined different from the start flag code, the divider 54 is not required.

A counter 55 is used for counting up the return control signal from the AND gate 47 and for counting down the detection signal from the divider 54. When the content of the counter 55 is zero, the divider 55 produces an output as a reset signal which is applied to a reset terminal of the flipflop 49.

In a simple circuit, the counter 55 may be omitted and the detection signal from the divider 54 may be applied to the reset terminal of the flipflop 49 as the reset signal.

The AND gate 39 opens the gate in response to the reset output from the flipflop 49 and closes the gate in response to the set output from the flipflop 49. Therefore, the AND gate 39 prevents the D channel signal delivered from the second register 43 from passing therethrough during a time duration when receiving the set output from the flipflop 49, and, on the other hand, permits the D channel signal to pass therethrough during another time duration when receiving the reset output from the flipflop 49.

In operation, the demultiplexer 34 receives an incoming basic TDM signal through the input port 311 and the transformer coupling circuit as the receive signal. The incoming signal has a frame format as shown in FIG. 2 and is transmitted from one of TEs 14 (FIG. 1) as a calling TE. The demultiplexer 34 demultiplexes the receive signal to extract the D channel signal having a frame format as shown in FIG. 3. The D channel signal is applied to the first and the second shift registers 41 and 43, sequentially.

When the calling TE 14 desires to communicate with the other TEs connected to the common user's bus line 13, the calling TE 14 set the predetermined identifier code in the SAPI field in a similar fashion of a conventional SAPI setting fashion or by keying an extension call key. Thus, the D channel signal has the predetermined code in the SAPI field.

When the start flag field in the D channel signal is registered in the second shift register 43, the SAPI field is also registered in the first shift register 41. Therefore, the first and the second comparators 42 and 44 produce the first and the second coincident signals as the return control signal and the available signal, because the contents in the first and the second shift registers 41 and 43 are coincident with the predetermined identifier code and the start flag code, respectively.

The AND gate 47 receives the available signal to permit the return control signal to pass therethrough. Therefore, the return control signal is applied to the flipflop 49 to set the flipflop. As a result, the flipflop 49 produces the set output which is applied to the first-in first-out register 50 as the enabling signal and to the AND gate 39 to close the gate.

Thus, the AND gate 39 is closed and prevents the D channel signal from passing to the DSL interface circuit 36. Therefore, the D channel signal is not delivered to the DSL 10 through the second port 32.

On the other hand, the first-in first-out register 50 starts its operation in response to the enabling signal and takes in the D channel signal from the second shift register 43 and sends out it as a return signal to the adder 40. Then, the return signal is delivered to the multiplexer 35. Therefore, the D channel signal is carried in the basic TDM signal (21) and returned to the first port 31 through the transformer coupling circuit 33 so as to transmit the TDM signal to the user's line 132.

Then, the return signal is also applied to the third shift register 51. When the stop flag field in the return signal is registered in the third shift register 51, the third comparator 52 produces the third coincident signal. The third coincidence signal is applied to the divider 54 to obtain the detection signal. The detection signal is applied to the counter 55.

The counter 55 counts up the return control signal and then counts down the detection signal. When the content in the counter 55 is zero, the counter 55 delivers the reset signal to the flipflop 49. Then, the flipflop 49 is reset and produces the reset output which is applied to the first-in first-out register 50 and the AND gate 39. Accordingly, the first-in first-out register 50 stops its operation and the AND gate 39 is open.

Thus, it is possible to establish a data link between one TE 14 to the other TEs 14 on the same user's line 13 without use of the DSL 10 and the ISDN digital switch 11 of the exchange office.

Another D channel signal in another basic TDM signal next incoming to the NT 30 has the predetermined identifier code, the D channel signal is also returned to the TEs on the common user's line 13 in the similar fashion as described above.

When the D channel signal of the incoming signal does not have the predetermined code, the return control signal is not produced from the first comparator 41. Therefore, the returning circuit 48 does not operate but the AND gate 39 is open to permit the D channel signal to pass therethrough. Therefore, the D channel signal is applied from the second shift register 43 to the DSL interface circuit 36 through the AND gate 39. Then, the DSL interface circuit 36 delivers the D channel signal in the TDM signal with the high rate to the DSL 10 through the second port 32. Thus, the normal ISDN communication can be effected through the DSL 10 and the digital switch 11.

What is claimed is:

1. A network termination unit for use in an integrated services digital network (ISDN) system, said network termination unit comprising a first port to which a plurality of terminal equipments are connected in parallel with one another, a second port to which a digital subscriber line is connected, a demultiplexer coupled to the first port for demultiplexing a first TDM (Time Division Multiplexed) signal incoming through the first port from one of the terminal equipments to extract a first control channel signal for establishing a data link, the first control channel signal having an identifier code, a digital subscriber line interface circuit coupled to the second port for transmitting the first control channel signal as a second control channel signal in a second TDM signal to the second port, said digital subscriber line interface circuit receiving a third TDM signal incoming through the second port to extract a third control channel signal, and a multiplexer coupled to the first port for multiplexing the third control channel signal as a fourth control channel signal in a fourth TDM signal to deliver the fourth TDM signal to the first port, wherein the improvement comprises:
code holding means for holding a predetermined code;
code deciding means coupled with said demultiplexer and said code holding means for deciding whether or not said identifier code in said first control signal is coincident with said predetermined identifier code, said code deciding means producing a return control signal when said identifier code is coincident with said predetermined code; and
returning means coupled with said code deciding means and responsive to said return control signal for returning said first control channel signal as a return signal to said multiplexer, said multiplexer receiving said return signal as the third control channel signal to thereby return said first control channel signal to said first port as the fourth control channel signal in the fourth TDM signal without delivering the second TDM signal including the first control channel signal to said second port.

2. A network termination unit as claimed in claim 1, wherein said code deciding means comprises first detector means which comprises:
first shift register means coupled to demultiplexer and having a first serial output and a first set of parallel outputs; and
first comparing means coupled to said code holding means and said first set of parallel outputs of said first shift register means for comparing said first set of outputs and said predetermined code in said code holding means to produce a first coincident signal as said return control signal when said first set of parallel outputs is coincident with said predetermined code.

3. A network termination unit as claimed in claim 2, said first control channel signal further comprising a predetermined start flag code, wherein said code deciding means further comprises:
start flag holding means for holding the predetermined start flag code; and
second detector means;
said second detector means comprising:
second shift register means coupled to said first serial output of said first shift register means and having a second serial output and a second set of parallel outputs;
second comparing means coupled to said start flag deciding means and said second set of parallel outputs of said second shift register for comparing the second set of parallel outputs and said predetermined start flag code to produce a coincident signal as an available signal when said set of second parallel outputs is coincident with the predetermined start flag code; and
permitting means coupled with said first and said second comparing means and said returning means for permitting said return control signal to pass to said returning means only a time duration when said available signal is produced from said second comparing means.

4. A network termination unit as claimed in claim 3, said first control channel signal further comprising a predetermined stop flag code, wherein said network termination unit further comprises:
stop flag holding means for holding the predetermined stop flag code; and
stop flag deciding means coupled with said returning means and said stop flag holding means for deciding said predetermined stop flag code in said return signal to produce a stop signal, said stop signal being supplied to said returning means, said returning means being unable in response to the stop signal.

5. A network termination unit as claimed in claim 4, said predetermined start flag code being equal to the predetermined stop flag code, wherein said stop flag deciding means comprises:
third shift register means coupled to said returning circuit and having a third set of parallel outputs for receiving said return signal;
third comparing means coupled to said stop flag holder and said third set of parallel outputs for comparing said predetermined stop flag code in said stop flag holder and said third set of parallel outputs to produce a third coincident signal when said predetermined stop flag code is coincident with said third set of parallel outputs; and
dividing means coupled to said third comparing means for frequency dividing said third coincident signal to produce a divided signal as a detection signal one at a time when receiving the third coincident signal twice, said stop signal being produced in response to the detection signal.

6. A network termination unit as claimed in claim 5, which further comprises counter means coupled to said permitting means and said dividing means for counting up said return control signal and counting down said detection signal to produce said stop signal when a content of said counter means is zero.

* * * * *